United States Patent
Hyodo et al.

(10) Patent No.: US 9,617,716 B2
(45) Date of Patent: Apr. 11, 2017

(54) WORK VEHICLE

(71) Applicant: KABUSHIKI KAISHA KCM, Kako-gun, Hyogo (JP)

(72) Inventors: Koji Hyodo, Kasumigaura (JP); Atsushi Shimazu, Toride (JP); Masashi Yamashita, Ushiku (JP); Tetsuji Tanaka, Abiko (JP); Isamu Aoki, Tsukuba (JP); Shoroku Kawahara, Ushiku (JP)

(73) Assignee: KCM Corporation, Hyogo (JP)

( * ) Notice: Subject to any disclaimer, the term of this patent is extended or adjusted under 35 U.S.C. 154(b) by 17 days.

(21) Appl. No.: 14/505,685

(22) Filed: Oct. 3, 2014

(65) Prior Publication Data
US 2015/0098784 A1     Apr. 9, 2015

(30) Foreign Application Priority Data

Oct. 3, 2013   (JP) .................................. 2013-208252

(51) Int. Cl.
*B60K 6/12*     (2006.01)
*E02F 9/22*     (2006.01)
(Continued)

(52) U.S. Cl.
CPC ............ *E02F 9/2246* (2013.01); *E02F 3/283* (2013.01); *E02F 9/2066* (2013.01);
(Continued)

(58) Field of Classification Search
CPC ...... E02F 9/20; E02F 9/22; F01N 3/20; F01N 3/0842; F01N 3/0871; F02D 41/021; F02D 41/0235; F02D 41/0275
See application file for complete search history.

(56) References Cited

U.S. PATENT DOCUMENTS

2006/0184307 A1*  8/2006  Kosaka ................... F01N 3/206
                                               701/110
2007/0016355 A1*  1/2007  Kamado ............... E02F 9/2246
                                               701/103
(Continued)

FOREIGN PATENT DOCUMENTS

| EP | 2 022 954 A1 | 2/2009 |
|---|---|---|
| EP | 2 151 528 A1 | 2/2010 |
| FR | 2 930 282 A3 | 10/2009 |
| FR | 2 961 558 A1 | 12/2011 |
| JP | 2002-371831 A | 12/2002 |
| JP | 4847218 B2 | 12/2011 |
| JP | 4847219 B2 | 12/2011 |

OTHER PUBLICATIONS

European Search Report dated Mar. 2, 2015 (Seven (7) pages).

*Primary Examiner* — J. Allen Shriver, II
*Assistant Examiner* — Travis Coolman
(74) *Attorney, Agent, or Firm* — Crowell & Moring LLP (57) ABSTRACT

A work vehicle includes: a hydraulic pump driven by an engine; a rotational speed detection unit that detects an actual rotational speed of the engine; an exhaust gas purification device that purifies nitrogen oxide in exhaust gas discharged from the engine using a reducing agent solution stored in a reducing agent tank; a torque control unit that decreases output torque of the engine according to decrease of a detected remaining amount of the reducing agent solution; and a storage device that stores a threshold value not less than an engine rotational speed at which the hydraulic pump starts discharge, wherein when the actual rotational speed of the engine is not more than the threshold value, the torque control unit does not decrease the output torque of the engine regardless of the remaining amount of the reducing agent solution detected by the remaining amount detection device.

8 Claims, 9 Drawing Sheets

(51) Int. Cl.
*E02F 9/20* (2006.01)
*F02D 41/02* (2006.01)
*E02F 3/28* (2006.01)
*F01N 11/00* (2006.01)
*F02D 41/00* (2006.01)
*F01N 3/20* (2006.01)
*E02F 9/08* (2006.01)

(52) U.S. Cl.
CPC .......... *E02F 9/2278* (2013.01); *E02F 9/2289* (2013.01); *F01N 11/00* (2013.01); *F02D 41/0097* (2013.01); *F02D 41/0235* (2013.01); *E02F 9/0883* (2013.01); *F01N 3/2066* (2013.01); *F01N 2550/05* (2013.01); *F01N 2590/08* (2013.01); *F01N 2610/02* (2013.01); *F01N 2900/1814* (2013.01); *F02D 2200/101* (2013.01); *F02D 2250/26* (2013.01); *F02D 2250/36* (2013.01)

(56) References Cited

U.S. PATENT DOCUMENTS

| | | | |
|---|---|---|---|
| 2009/0320461 A1* | 12/2009 | Morinaga | B66F 9/22 60/431 |
| 2010/0031650 A1* | 2/2010 | Morinaga | B60L 1/003 60/459 |
| 2010/0050601 A1* | 3/2010 | Nakamura | B01D 53/90 60/277 |
| 2010/0139255 A1* | 6/2010 | Kamiya | E02F 9/00 60/287 |
| 2011/0167811 A1* | 7/2011 | Kawaguchi | E02F 9/2246 60/395 |
| 2012/0166062 A1* | 6/2012 | Bald | F01N 3/208 701/102 |

\* cited by examiner

WORK VEHICLE

INCORPORATION BY REFERENCE

The disclosure of the following priority application is herein incorporated by reference: Japanese Patent Application No. 2013-208252 filed Oct. 3, 2013.

BACKGROUND OF THE INVENTION

1. Field of the Invention

The present invention relates to a work vehicle provided with an exhaust gas purification device that purifies exhaust gas discharged from an engine that drives a hydraulic pump.

2. Description of Related Art

There has been known an automobile provided with an exhaust gas purification device that reduces nitrogen oxide in exhaust gas and removes it (refer to Japanese Laid-Open Patent Publication No. 2002-371831). In the automobile described in Japanese Laid-Open Patent Publication No. 2002-371831, when a reducing agent solution (urea water) in a tank is consumed, and a remaining amount of the reducing agent solution becomes not more than a prescribed amount, an engine control unit controls an engine to a low output, and prevents high-output operation.

SUMMARY OF THE INVENTION

Since a technology described in the above-mentioned Japanese Laid-Open Patent Publication No. 2002-371831 is the technology in the automobile, it cannot be applied as it is to a work vehicle, such as a wheel loader. The work vehicle, such as the wheel loader has a hydraulic pump driven by an engine, and supplies pressure oil to an actuator of a front work device including an arm, a bucket, etc. For this reason, a relation between an output of the engine and an output of the hydraulic pump is important in the work vehicle.

In the work vehicle, a load of the engine changes according to an operation state (a work state and a traveling state) of the vehicle, such as a state of traveling without driving the front work device, a state of driving the front work device while making the vehicle travel, or a state of driving the front work device in a stopped state. When the above-mentioned technology described in Japanese Laid-Open No. 2002-371831 is applied to control the engine to the low output according to the decrease of the urea water remaining amount, the load of the engine becomes large depending on the work state and the traveling state, and engine stall might occur.

According to the 1st aspect of the present invention, a work vehicle including a front work device, comprises: a hydraulic pump driven by an engine; a hydraulic motor that is connected to the hydraulic pump in a closed circuit and is driven by pressure oil discharged from the hydraulic pump; a rotational speed detection unit that detects an actual rotational speed of the engine; an exhaust gas purification device that purifies nitrogen oxide in exhaust gas discharged from the engine using a reducing agent solution stored in a reducing agent tank; a remaining amount detection device that detects a remaining amount of the reducing agent solution in the reducing agent tank; a torque control unit that decreases output torque of the engine according to decrease of the remaining amount of the reducing agent solution detected by the remaining amount detection device; and a storage device that stores a threshold value not less than an engine rotational speed at which the hydraulic pump starts discharge, wherein when the actual rotational speed of the engine detected by the rotational speed detection unit is not more than the threshold value stored in the storage device, the torque control unit does not decrease the output torque of the engine regardless of the remaining amount of the reducing agent solution detected by the remaining amount detection device.

According to the 2nd aspect of the present invention, in the work vehicle according to the 1st aspect, it is preferred that the torque control unit decreases the output torque of the engine in stages and also decreases the threshold value according to the decrease of the remaining amount of the reducing agent solution detected by the remaining amount detection device.

According to the 3rd aspect of the present invention, in the work vehicle according to the 1st or 2nd aspect, it is preferred that the torque control unit decreases the output torque of the engine and also decreases a rotational speed of the engine in a rated point according to the decrease of the remaining amount of the reducing agent solution detected by the remaining amount detection device.

According to the 4th aspect of the present invention, in the work vehicle according to any one of the 1st to 3rd aspects, it is preferred that an engine rotational speed at which the hydraulic pump starts discharge is set to be not less than a low-idle rotational speed of the engine.

According to the 5th aspect of the present invention, in the work vehicle according to any one of the 1st to 4th aspects, it is preferred that the work vehicle further comprises a fixed displacement hydraulic pump that supplies pressure oil to an actuator that drives the front work device.

DESCRIPTION OF EMBODIMENTS

Hereinafter, one embodiment of a work vehicle according to the present invention will be explained with reference to drawings.

—First Embodiment—

Figure 1:
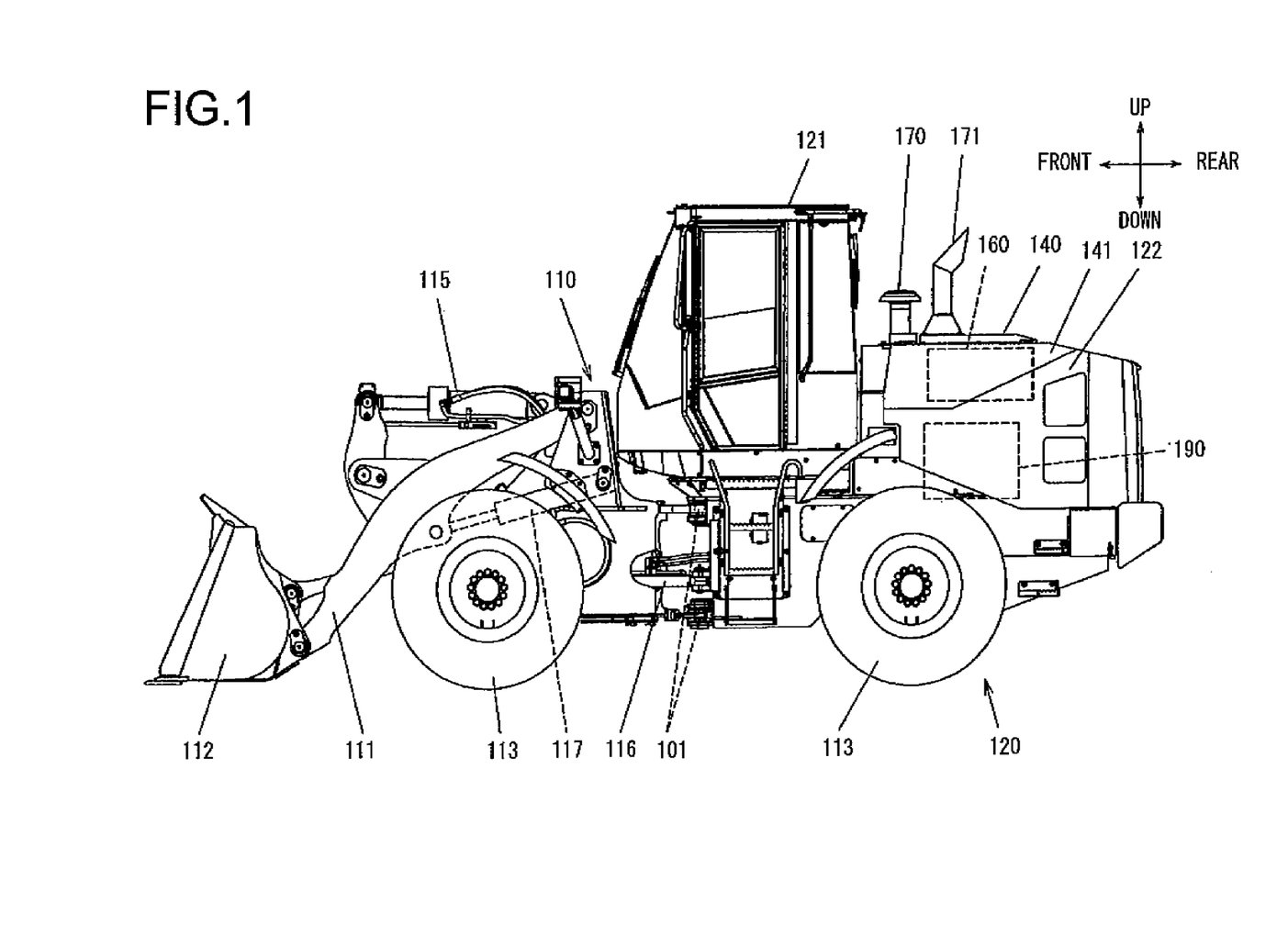
FIG. 1 is a side view of a wheel loader that is one example of a work vehicle according to a first embodiment of the present invention.

FIG. 1 is a side view of a wheel loader that is one example of a work vehicle according to a first embodiment. The wheel loader includes: a front vehicle body 110 having an arm 111, a bucket 112, front wheels, etc.; and a rear vehicle body 120 having an operator's cab 121, a machine room 122, rear wheels, etc.

The arm 111 turns (rises and lowers) in a up and down (vertical) direction by drive of an arm cylinder 117, and the bucket 112 turns (crowds or dumps) in the up and down (vertical) direction by drive of a bucket cylinder 115. The front vehicle body 110 and the rear vehicle body 120 are turnably coupled to each other by center pins 101, and the front vehicle body 110 bends from side to side with respect to the rear vehicle body 120 by expansion and contraction of a steering cylinder 116.

An upper side of the machine room 122 is covered with an engine hood 140, and sides thereof are covered with an openable housing cover 141. To the engine hood 140, attached are an air intake pipe 170 for taking in the air needed for drive of an engine 190 from outside, and a tail pipe 171 for discharging exhaust gas. The engine 190 and an exhaust gas purification device (an exhaust emission control device) 160 are arranged in the machine room 122.

Figure 2:
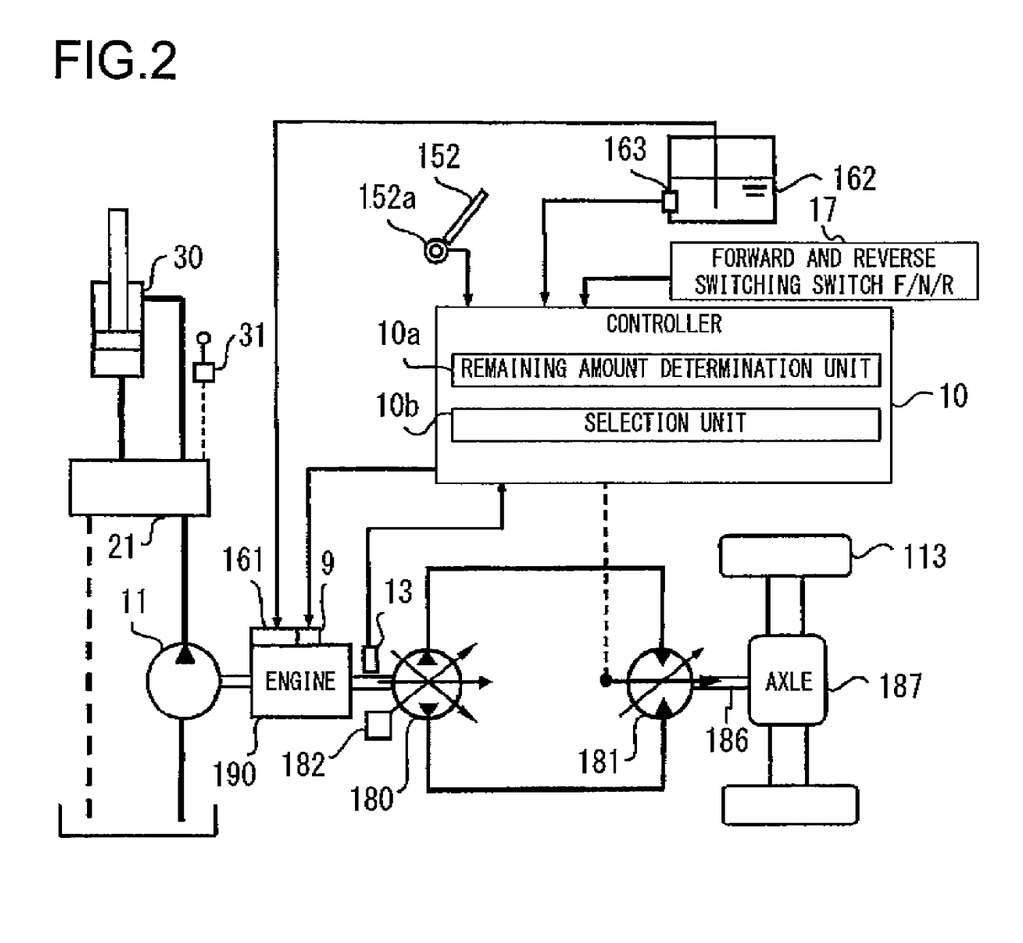
FIG. 2 is a diagram showing a schematic configuration of the wheel loader according to the first embodiment of the present invention.

FIG. 2 is a diagram showing a schematic configuration of the wheel loader according to the first embodiment. As shown in FIG. 2, the wheel loader has a so-called HST (Hydro Static Transmission) traveling drive device (traveling system), and has a hydraulic pump (hereinafter described as an HST pump 180) driven by the engine 190, and a hydraulic motor 181 that is connected to the HST pump 180 in a closed circuit. When the hydraulic motor 181 rotates by pressure oil discharged from the HST pump 180, output torque of the hydraulic motor 181 is transmitted to an output shaft 186 through a gearbox, which is not shown. Consequently, tires 113 rotate through an axle 187, and the vehicle travels.

Figure 3:
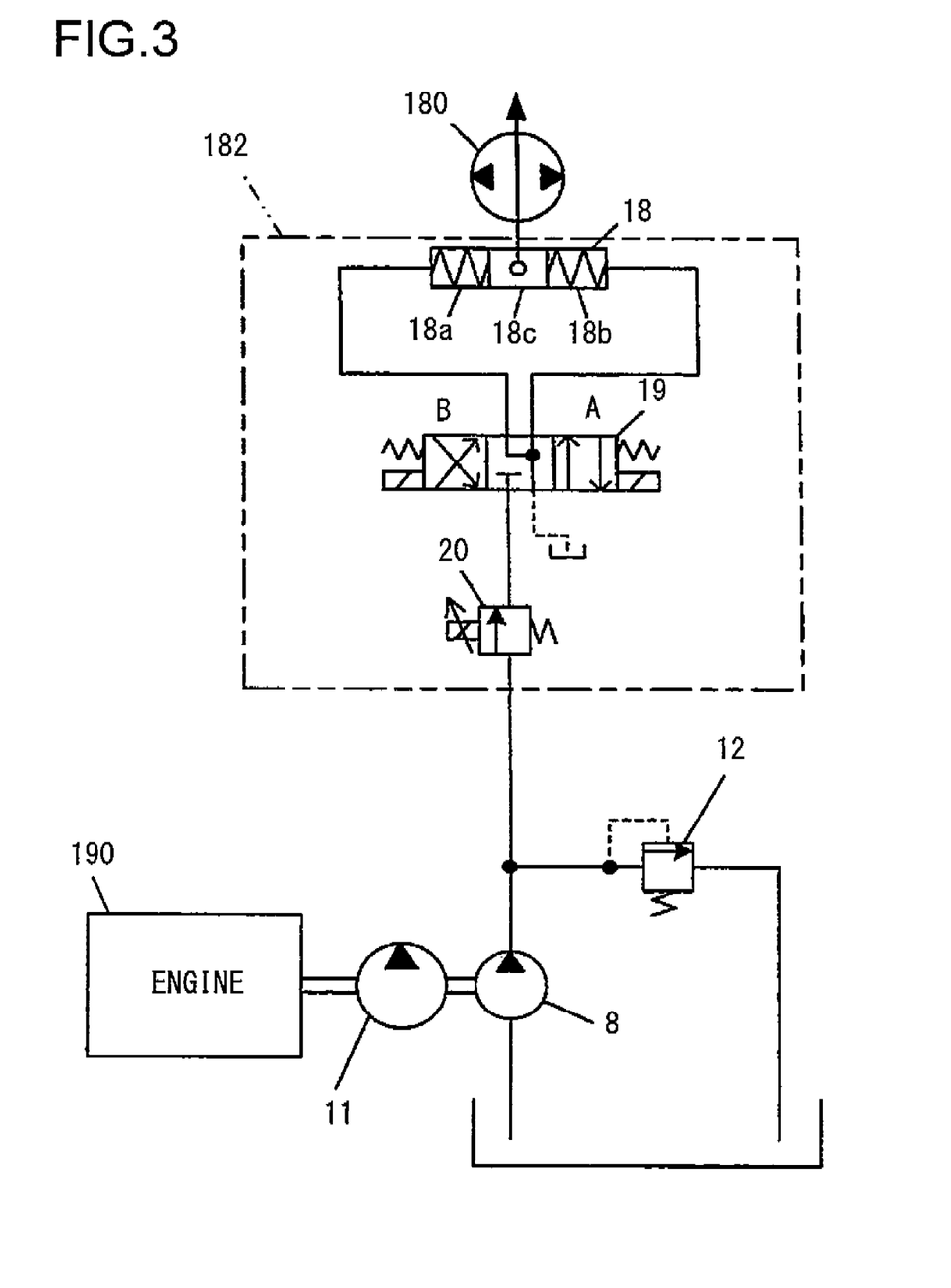
FIG. 3 is a diagram showing a configuration of a regulator of FIG. 2.

The HST pump 180 is a swash plate type or a bent axis type variable displacement hydraulic pump in which a displacement is changed according to a tilt angle. The displacement is controlled by a regulator 182. FIG. 3 is a diagram showing a configuration of the regulator 182 of FIG. 2. As shown in FIG. 3, the regulator 182 has: a tilt (displacement) cylinder 18; a forward and reverse switching valve 19 that is switched according to operation of a forward and reverse switching switch 17; and a solenoid (electromagnetic) proportional pressure reducing valve (hereinafter described as a solenoid proportional valve 20) that adjusts a control pressure according to a control signal from a controller 10. Pressure oil from a charge pump 8 driven by the engine 190 is pressure-reduced through the solenoid proportional valve 20, and is guided to the tilt cylinder 18 through the forward and reverse switching valve 19 as the control pressure. Note that a discharge pressure (a primary pressure) of the charge pump 8 is limited to a predetermined value by a relief valve 12. The control pressure is supplied to the tilt cylinder 18 through the forward and reverse switching valve 19, the displacement is controlled according to the control pressure, and also an operation direction of the tilt cylinder 18 is controlled according to switching of the forward and reverse switching valve 19, and a tilt direction of the HST pump 180 is controlled.

As shown in FIG. 2, the wheel loader is provided with a front work device (work system) configured to include: a fixed displacement hydraulic pump (hereinafter described as a working pump 11); a control valve 21; an actuator 30; the arm 111; and the bucket 112. The working pump 11 is driven by the engine 190, and discharges pressure oil.

The pressure oil discharged from the working pump 11 is supplied to the working actuator 30 through the control valve 21, and the actuator 30 is driven. The control valve 21 is operated with a control lever 31, and controls a flow of the pressure oil from the working pump 11 to the actuator 30. Note that in FIG. 2, for convenience, an arm operation lever and a bucket operation lever are collectively described as the control lever 31, the arm cylinder 117 and the bucket cylinder 115 are collectively described as the actuator 30, and an arm control valve or a bucket control valve is collectively described as the control valve 21. The arm operation lever outputs a raising/lowering command of the arm 111, and the bucket operation lever outputs a tilting/dumping command of the bucket 112.

The exhaust gas purification device 160 is provided with: a treatment device 161 that performs treatment to purify nitrogen oxide in exhaust gas discharged from the engine 190, for example, using a urea water solution (hereinafter described as urea water) as a reducing agent solution; a urea water tank 162 for storing urea water supplied to the treatment device 161; and a remaining amount sensor 163 that detects a remaining amount of the urea water in the urea water tank 162.

The controller 10 is configured to include an arithmetic processing device having a CPU, a ROM and a RAM, which are storage devices, other peripheral circuits, etc. As shown in FIG. 2, to the controller 10, connected are an accelerator operation amount detector 152a that detects a pedal operation amount (a pedal stroke or a pedal angle) of an accelerator pedal 152, and a rotational speed sensor 13 that detects an actual rotational speed of the engine 190 and outputs an actual rotational speed signal to the controller 10.

The controller 10 sets a target engine rotational speed of the engine 190 according to the pedal operation amount (stepping amount) of the accelerator pedal 152 detected by the accelerator operation amount detector 152a. When the pedal operation amount of the accelerator pedal 152 becomes large, the target engine rotational speed becomes large, and the target engine rotational speed at the time of maximum pedal stepping becomes a rated rotational speed in a rated point, which will be mentioned later.

The controller 10 outputs a control signal corresponding to a set target engine rotational speed to an engine controller 9. The engine controller 9 compares the actual rotational speed of the engine 190 detected by the rotational speed sensor 13 with the target engine rotational speed from the controller 10, and controls a fuel injection device (not shown) in order to bring the actual rotational speed of the engine 190 close to the target engine rotational speed.

As shown in FIG. 2, the forward and reverse switching switch 17 that commands advance and back movement of the vehicle is connected to the controller 10, and an operation position (forward (F)/neutral (N)/reverse (R)) of the forward and reverse switching switch 17 is detected by the controller 10. The controller 10 outputs the control signal to the forward and reverse switching valve 19 shown in FIG. 3 according to the operation position of the forward and reverse switching switch 17. The forward and reverse switching valve 19 is switched according to the input control signal, the control pressure is supplied to the tilt cylinder 18 through the forward and reverse switching valve 19, and the operation direction and an operation amount of the tilt cylinder 18 are controlled. As a result, the tilt direction and the displacement of the HST pump 180 are controlled.

When the forward and reverse switching switch 17 is switched to a neutral (N) position, a pressure of each of oil chambers 18a and 18b of the tilt cylinder 18 becomes a tank pressure, and a piston 18c is located at a neutral position. For this reason, the displacement of the HST pump 180 becomes zero, and a pump discharge flow amount becomes zero.

When the forward and reverse switching switch 17 is switched to a forward (F) position, the forward and reverse switching valve 19 is switched to an A side, and the pressure oil from the charge pump 8 is pressure-reduced by the solenoid proportional valve 20 to act on the oil chamber 18a. The tank pressure acts on the oil chamber 18b. For this reason, a pressure difference occurs between the oil chambers 18a and 18b of the tilt cylinder 18, the piston 18c is displaced in a right direction shown in FIG. 3, and the displacement of the HST pump 180 increases. The HST pump 180 rotates to a forward side, and the discharge flow amount according to the engine rotational speed and the displacement is discharged from the HST pump 180.

When the forward and reverse switching switch 17 is switched to a reverse (k) position, the forward and reverse switching valve 19 is switched to a B side, and the pressure oil from the charge pump 8 is pressure-reduced by the solenoid proportional valve 20 to act on the oil chamber 18b. The tank pressure acts on the oil chamber 18a. For this reason, a pressure difference occurs between the oil chambers 18a and 18b of the tilt cylinder 18, the piston 18c is displaced in a left direction shown in FIG. 3, and the displacement of the HST pump 180 increases. The HST pump 180 rotates to a reverse side, and the discharge flow amount according to the engine rotational speed and the displacement is discharged from the HST pump 180.

Figure 4A:
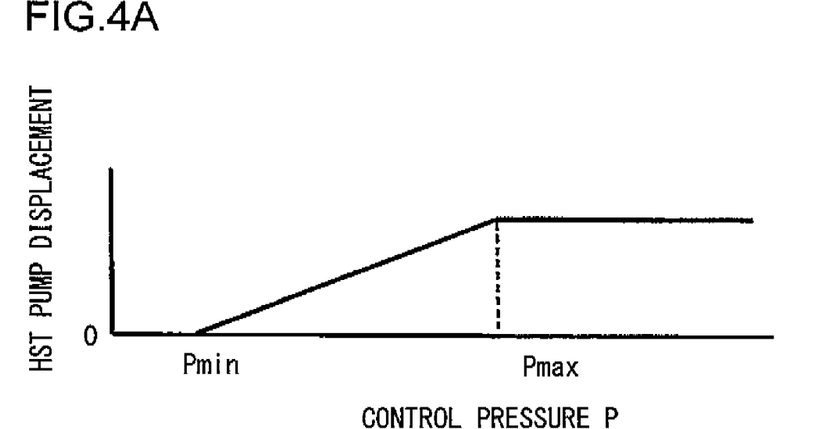
FIG. 4A is a graph showing a relation between a control pressure and a displacement of an HST pump.

FIG. 4A is a graph showing a relation between a control pressure P and the displacement of the HST pump 180. The displacement is set to be a minimum value in a range where the control pressure P is less than Pmin, increases according to increase of the control pressure P in a range where the control pressure P is not less than Pmin and less than Pmax, and is set to be a maximum value when the control pressure P is Pmax.

Figure 4B:
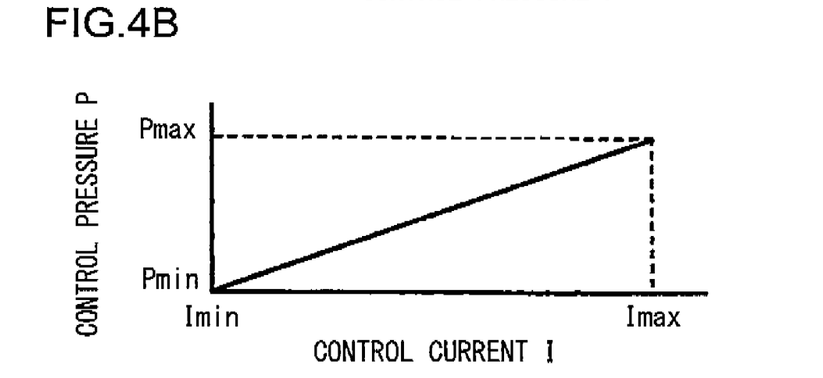
FIG. 4B is a graph showing a relation between a control current and a control pressure (a secondary pressure) of a solenoid proportional valve.

FIG. 4B is a graph showing a relation between a control current I and the control pressure P (a secondary pressure) of the solenoid proportional valve 20. A degree of pressure reduction of the solenoid proportional valve 20 is controlled by the control current I from the controller 10. A valve characteristic of the solenoid proportional valve 20 is set so that the degree of pressure reduction becomes smaller, i.e., the control pressure P, which is the secondary pressure, becomes larger, along with increase of the control current I input to the solenoid.

Figure 4C:
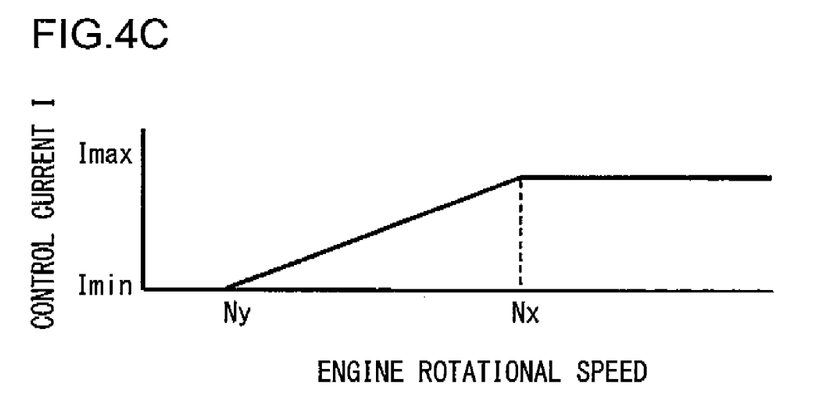
FIG. 4C is a graph showing a relation between an engine rotational speed and a control current.

FIG. 4C is a graph showing a relation between the engine rotational speed and the control current I. Characteristics of the control current I with respect to the engine rotational speed shown in FIG. 4C are stored in a storage device of the controller 10 in a form of a lookup table. In a characteristic table, the control current I=Imin is established in a range where the engine rotational speed is less than Ny, and the control current I=Imax is established in a range where the engine rotational speed is not less than Nx. In the characteristic table, the control current I increases from the minimum value Imin to the maximum value Imax in accordance with increase in the engine rotational speed in a range where the engine rotational speed is not less than Ny and less than Nx.

Figure 5A:
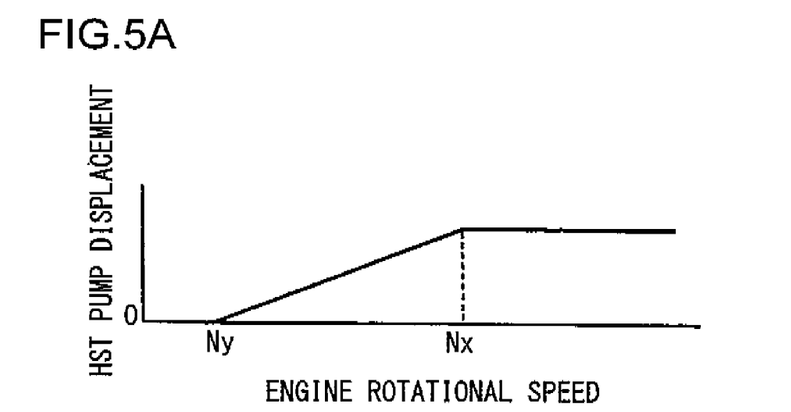
FIG. 5A is a graph showing a characteristic of the displacement of the HST pump with respect to an engine rotational speed.
Figure 5B:
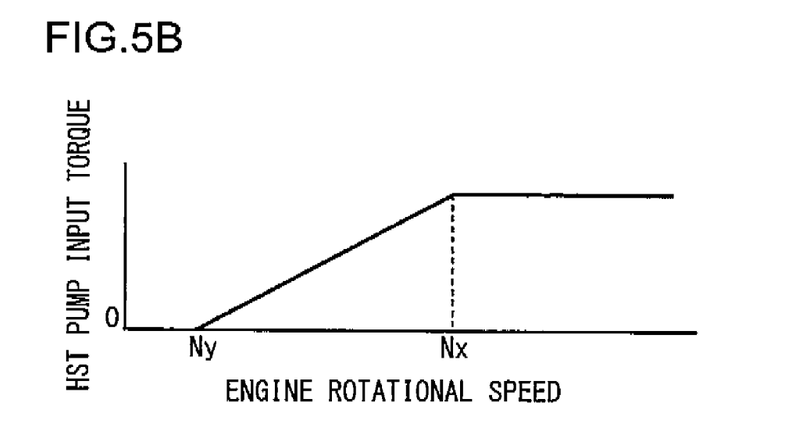
FIG. 5B is a graph showing a characteristic of input torque of the HST pump with respect to the engine rotational speed.
Figure 5C:
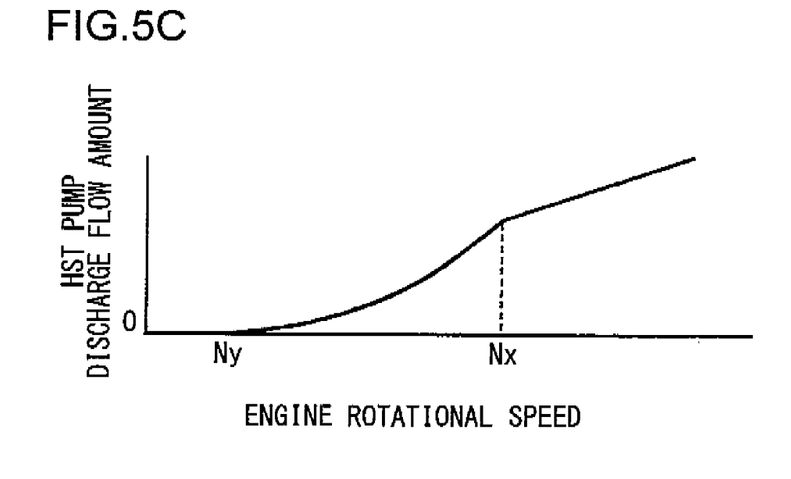
FIG. 5C is a graph showing a characteristic of a discharge flow amount of the HST pump with respect to the engine rotational speed.

FIGS. 5A, 5B, and 5C are graphs showing characteristics of the displacement, input torque, and the discharge flow amount of the HST pump 180 with respect to the engine rotational speed. In FIGS. 5A, 5B, and 5C, Ny is an engine rotational speed at which the HST pump 180 starts discharge, and it is hereinafter described as the discharge starting speed Ny. The discharge starting speed Ny is set to be a value not less than a low-idle rotational speed Ns (Ny≥Ns). FIG. 5A is the graph showing the characteristic of the displacement of the HST pump 180 with respect to the engine rotational speed. As described above, when the control current I is set based on the engine rotational speed, the control pressure P according to the control current I is output from the solenoid proportional valve 20, and the displacement of the HST pump 180 is controlled. That is, the displacement of the HST pump 180 is increased according to rise of the engine rotational speed as shown in FIG. 5A.

As shown in FIG. 5A, the displacement is zero in a range where the engine rotational speed is less than the discharge starting speed Ny. In a range where the engine rotational speed is not less than the discharge starting speed Ny and less than Nx, the control pressure rises in proportion to the increase in the engine rotational speed, and the displacement of the HST pump 180 increases. The displacement of the HST pump 180 becomes a maximum one in a range where the engine rotational speed is not less than Nx.

FIG. 5B is the graph showing the characteristic of the input torque of the HST pump 180 with respect to the engine rotational speed. The HST pump input torque is decided by the displacement and a circuit pressure of an HST traveling circuit, FIG. 5B shows the HST pump input torque characteristic when the circuit pressure is set as a relief pressure, The input torque of the HST pump 180 increases according to increase in the displacement of the HST pump 180. As described above, since the displacement of the HST pump 180 increases in proportion to the rise of the engine rotational speed, the HST pump input torque increases in proportion to the increase in the engine rotational speed as shown in FIG. 5B.

FIG. 5C is the graph showing the characteristic of the discharge flow amount of the HST pump 180 with respect to the engine rotational speed. As shown in FIG. 5C, the discharge flow amount is zero in the range where the engine rotational speed is less than the discharge starting speed Ny. Since both of the rotational speed and the displacement of the HST pump 180 increase in the range where the engine rotational speed is not less than the discharge starting speed Ny and less than Nx, the discharge flow amount of the HST pump 180 increases curvilinearly and smoothly with good responsiveness according to the increase in the engine rotational speed, and smooth and strong acceleration can be obtained. Since the displacement is the maximum one in the range where the engine rotational speed is not less than Nx (refer to FIG. 5A), the discharge flow amount of the HST pump 180 linearly increases according to the increase in the engine rotational speed.

The hydraulic motor 181 shown in FIG. 2 is a variable displacement motor, a control signal is output to a tilt control device, which is not shown, from the controller 10, and a displacement (motor capacity) is controlled. The displacement of the hydraulic motor 181 is controlled according to a traveling circuit pressure of the HST traveling circuit.

To the controller 10, connected is the remaining amount sensor 163 that detects a remaining amount of the urea water in the urea water tank 162 and outputs a remaining amount signal to the controller 10. The remaining amount sensor 163 is a water level sensor that detects a water level of the urea water in the urea water tank 162.

Figure 6A:
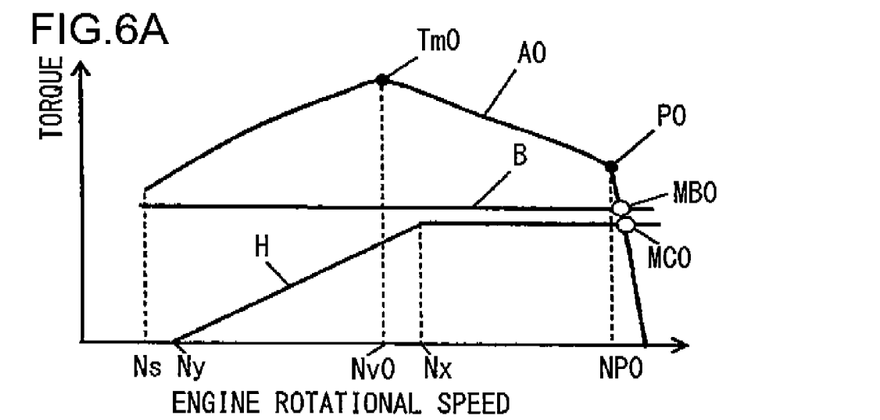
FIGS. 6A, 6B, and 6C are torque diagrams of the wheel loader according to the first embodiment of the present invention.
Figure 6B:
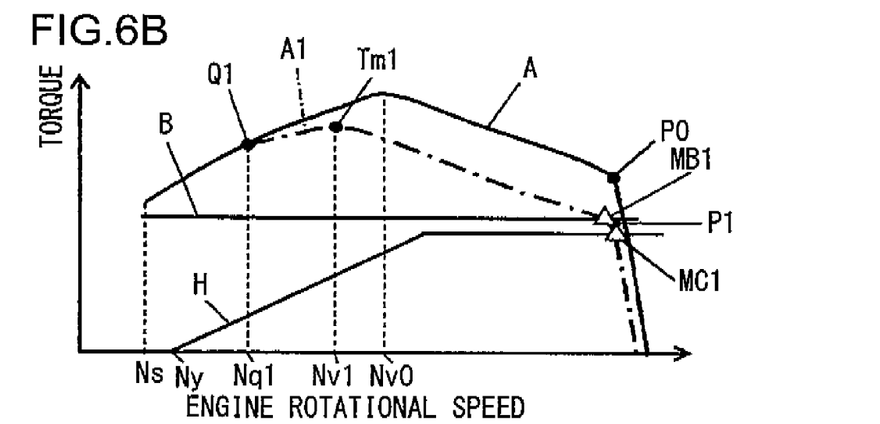
Figure 6C:
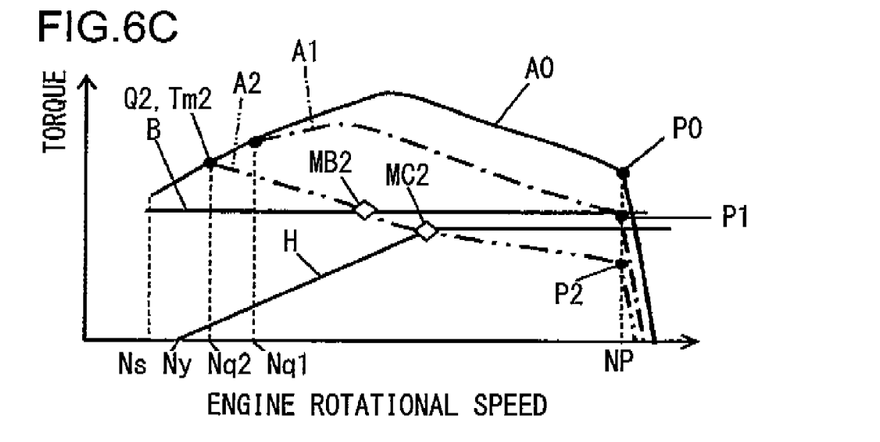

FIGS. 6A, 6B and 6C are torque diagrams of the wheel loader according to the first embodiment, they show relations between an engine rotational speed and torque when the accelerator pedal 152 is stepped at the maximum, and show an engine output torque characteristic, a working pump input torque characteristic, and an HST pump input torque characteristic. A plurality of engine output torque characteristics A0, A1, and A2 are stored in the storage device of the controller 10 in a form of a lookup table. As will be mentioned later, the characteristic A0 is used when the remaining amount of the urea water is not less than a first predetermined amount (an unlimited stage (or phase)), the characteristic A1 is used when the remaining amount of the urea water is less than the first predetermined amount and not less than a second predetermined amount (a first limited stage (or phase)), and the characteristic A2 is used when the remaining amount of the urea water is less than the second predetermined amount (a second limited stage (or phase)).

The engine output torque characteristics A0, A1, and A2 show relations between an engine rotational speed and maximum engine output torque, respectively. Note that the maximum engine output torque means maximum torque that the engine 190 can output in each rotational speed, A region prescribed by an engine output torque characteristic (a maximum torque line) shows performance that the engine 190 can exhibit. The engine mounted in the wheel loader has a droop characteristic in which torque rapidly reduces in a rotational speed region exceeding a rated point (rated highest torque) P0. In FIGS. 3A, 3B, 4A, and 4B, a droop line is defined by a straight line that connects the rated point and an engine maximum rotational speed in a no-load state of the pump, In the wheel loader, matching control is performed utilizing such engine output torque characteristic, and the engine 190, the working pump 11 and the HST pump 180 are operated at a matching point, which will be mentioned later.

As shown in FIG. 6A, in the engine output torque characteristic A0, torque increases according to rise of the engine rotational speed in a range where the engine rotational speed is not less than a minimum rotational speed (a low-idle rotational speed) Ns and not more than Nv0, and torque becomes a maximum value (a maximum torque point Tm0) in the characteristic A0 when the engine rotational speed is Nv0. Note that the low-idle rotational speed is an engine rotational speed at the time of non-operation of the accelerator pedal 152. In the engine output torque characteristic A0, when the engine rotational speed becomes larger than Nv0, torque decreases according to the rise of the engine rotational speed, and when the torque reaches the rated point P0, a rated output can be obtained. When the engine rotational speed rises exceeding a rated rotational speed NP0 in the rated point P0, torque rapidly decreases.

As shown in FIG. 6B, the engine output torque characteristic A1 is the same characteristic as the characteristic A0 in a range where the engine rotational speed is not less than (more than and equal to) the low-idle rotational speed Ns and not more than (less than and equal to) a threshold value Nq1 (a limit starting point Q1). In the engine output torque characteristic A1, when the engine rotational speed becomes larger than the threshold value Nq1, an increasing rate of torque according to the rise of the engine rotational speed decreases compared with the characteristic A0. The threshold value Nq1 is set to be a value not less than the discharge starting speed Ny (Nq1≥Ny).

In the engine output torque characteristic A1, when the engine rotational speed is Nv1 smaller than Nv0 (Nv1<Nv0), torque becomes a maximum value (a maximum torque point Tm1) in the characteristic A1. A torque value in the maximum torque point Tm1 is smaller than a torque value of the maximum torque point Tm0 in the characteristic A0. In the engine output torque characteristic A1, when the engine rotational speed becomes larger than Nv1, torque decreases according to the rise of the engine rotational speed.

As shown in FIG. 6C, the engine output torque characteristic A2 is the same characteristic as the characteristic A0 in a range where the engine rotational speed is not less than the low-idle rotational speed Ns and not more than a threshold value Nq2 (a limit starting point Q2). In the engine output torque characteristic A2, when the engine rotational speed becomes larger than the threshold value Nq2, torque decreases according to the rise of the engine rotational speed. That is, in the engine output torque characteristic A2, when the engine rotational speed is Nq2 smaller than Nv1 (Nq2<Nv1), torque becomes a maximum value (a maximum torque point Tm2) in the characteristic A2. A torque value in the maximum torque point Tm2 is smaller than a torque value of the maximum torque point Tm1 in the characteristic A1. The threshold value Nq2 is set to be a value not less than the discharge starting speed Ny (Nq2≥Ny). The threshold value Nq2 is smaller than the threshold value Nq1 (Nq2<Nq1).

The working pump input torque characteristic B shows a relation between the engine rotational speed and maximum pump input torque (maximum pump absorption torque). Since the working pump 11 is a fixed displacement pump, the working pump input torque characteristic B becomes a constant value regardless of the engine rotational speed.

An HST pump input torque characteristic H is the characteristic shown in FIG. 5B, and it is decided based on the displacement of the HST pump 180 that increases according to the rise of the engine rotational speed, and the traveling circuit pressure (a motor driving pressure). As shown in FIG. 6A, in the characteristic H, torque gradually increases according to the rise of the engine rotational speed in the range where the engine rotational speed is not less than the threshold value Ny and less than Nx. In the characteristic H, the torque becomes a maximum value in the characteristic H regardless of the engine rotational speed in the range where the engine rotational speed is not less than the threshold value Nx larger than Ny.

As shown in FIGS. 6A, 6B, and 6C, intersections MC0, MC1, and MC2 of each of the characteristics A0, A1, and A2 with the characteristic H, and intersections MB0, MB1, and MB2 of each of the characteristics A0, A1, and A2 with the characteristic B are matching points.

Engine output torque and HST pump input torque in a state (hereinafter described as a traveling system single operation state) where the traveling drive device (traveling system) is actuated without actuating the front work device (work system) become values of the intersections MC0, MC1, and MC2. Engine output torque and working pump input torque in a state (hereinafter described as a work system single operation state) where the front work device (work system) is actuated without actuating the traveling drive device (traveling system) become values of the intersections MB0, MB1, and MB2.

As shown in FIG. 2, the controller 10 is functionally provided with a remaining amount determination unit 10a and a selection unit 10b. The remaining amount determination unit 10a determines whether a remaining amount (water level) h of the urea water detected by the remaining amount sensor 163 is not less than or less than a predetermined amount. If the remaining amount h of the urea water is not less than a first predetermined amount h1, i.e., if the urea water is sufficiently stored, the remaining amount determination unit 10a determines the urea water to be in the unlimited stage. If the remaining amount h of the urea water is less than the first predetermined amount h1 and not less than a second predetermined amount h2, the remaining amount determination unit 10a determines the urea water to be in the first limited stage. If the remaining amount h of the urea water is less than the second predetermined amount h2, the remaining amount determination unit 10a determines the urea water to be in the second limited stage. Information on the first predetermined amount h1, and the second predetermined amount h2 smaller than the first predetermined amount h1 is previously stored in the storage device of the controller 10.

The selection unit 10b selects the engine output torque characteristic according to a result determined by the remaining amount determination unit 10a. If the urea water is determined to be in the unlimited stage by the remaining amount determination unit 10a, the selection unit 10b selects the engine output torque characteristic A0. If the urea water is determined to be in the first limited stage by the remaining amount determination unit 10a, the selection unit 10b selects the engine output torque characteristic A1. If the urea water is determined to be in the second limited stage by the remaining amount determination unit 10a, the selection unit 10b selects the engine output torque characteristic A2.

Figure 7:
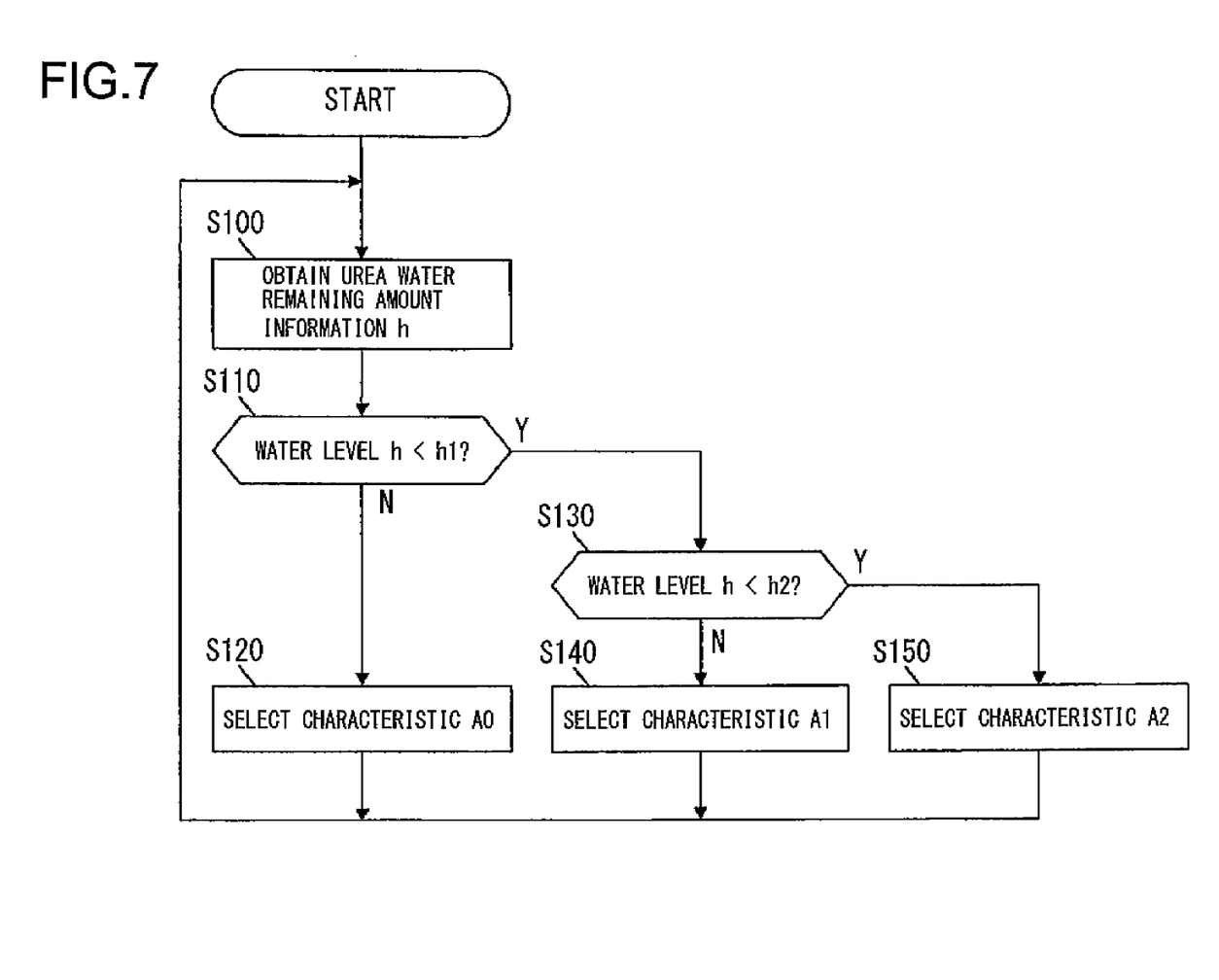
FIG. 7 is a flow chart showing operation of limiting control processing of engine output torque by a controller.

Hereinafter, limiting control of engine output torque performed according to the remaining amount of the urea water will be explained using a flow chart of FIG. 7. FIG. 7 is the flow chart showing operation of limiting control processing of engine output torque by the controller 10. When an ignition switch (not shown) is turned on, a program that performs processing shown in FIG. 7 is started, and is repeatedly executed by the controller 10.

In step S100, information on a remaining amount detected by the remaining amount sensor 163, i.e., on a water level in the urea water tank 162 is obtained, and the processing proceeds to step S110.

In step S110, the remaining amount determination unit 10a determines whether or not the remaining amount h of the urea water obtained in step S100 is less than the first predetermined amount h1. If negative determination is performed in step S110, the remaining amount determination unit 10a determines the urea water to be in the unlimited stage, and the processing proceeds to step S120, while if affirmative determination is performed, the processing proceeds to step S130.

In step S120, the selection unit 10b selects the engine output torque characteristic A0 from the storage device, and the processing returns to step S100.

In step S130, the remaining amount determination unit 10a determines whether or not the remaining amount h of the urea water obtained in step S100 is less than the second predetermined amount h2. If negative determination is performed in step S130, the remaining amount determination unit 10a determines the urea water to be in the first limited stage, and the processing proceeds to step S140, while if affirmative determination is performed, the remaining amount determination unit 10a determines the urea water to be in the second limited stage, and the processing proceeds to step S150, In step S140, the selection unit 10b selects the engine output torque characteristic A1 from the storage device, and the processing returns to step S100.

In step S150, the selection unit 10b selects the engine output torque characteristic A2 from the storage device, and the processing returns to step S100.

As described above, in the present embodiment, the engine output torque characteristic is changed according to the decrease of the urea water remaining amount. The controller 10 controls a fuel injection amount of the engine 190 based on the target engine rotational speed by the accelerator pedal 152 and the actual rotational speed detected by the rotational speed sensor 13 with reference to characteristic tables (A0, A1, and A2) selected by the selection unit 10b. The controller 10 calculates the control current I based on the actual rotational speed detected by the rotational speed sensor 13 with reference to the characteristic table shown in FIG. 4C, and controls the displacement of the HST pump 180 by controlling the control pressure from the solenoid proportional valve 20.

According to the first embodiment explained above, next operational effects can be obtained.

(1) The output torque of the engine 190 was decreased according to the decrease of the remaining amount of the urea water in the urea water tank 162. Consequently, an operator can recognize that there is a little remaining amount of the urea water since an operation state is getting worse compared with an ordinary time. That is, according to the present embodiment, high-output operation in a state where the remaining amount of the urea water has decreased is prevented, and the operator can be urged to replenish the urea water.

(2) When the actual rotational speed of the engine 190 was in a low rotational speed region, the output torque of the engine 190 was made not to decrease regardless of the remaining amount of the reducing agent solution. In the present embodiment, even in a case where the remaining amount of the urea water decreased, and where the stage changed from the unlimited stage to the first limited stage, the output torque of the engine 190 was made not to decrease in a range where the actual rotational speed of the engine 190 was not more than the threshold value Nq1. Even in a case where the remaining amount of the urea water decreased, and where the stage changed from the first limited stage to the second limited stage, the output torque of the engine 190 was made not to decrease in a range where the actual rotational speed of the engine 190 was not more than the threshold value Nq2. Furthermore, the threshold values Nq1 and Nq2 of the engine rotational speeds in the limit starting points Q1 and Q2 of the engine output torque were set to be not less than the discharge starting speed Ny. Consequently, even in a case where a load corresponding to the relief pressure of the working pump 11 acts in a state where the engine 190 is rotating in the low rotational speed region, engine stall is prevented from occurring.

Figure 8:
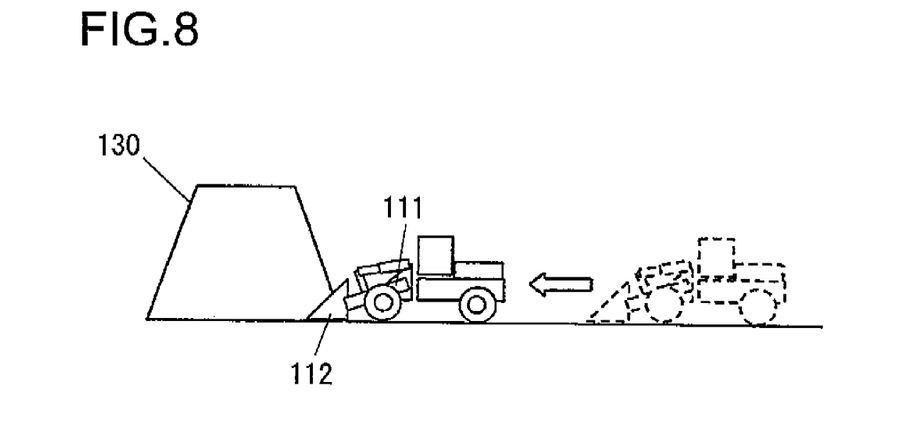
FIG. 8 is a diagram showing excavation work by the wheel loader.

For example, as shown in FIG. 8, in the wheel loader, excavation work is performed by the following: the bucket 112 is thrust into a natural ground 130; the arm 111 is operated upwardly after operating the bucket 112; or only the arm 111 is finally operated upwardly while simultaneously operating the bucket 112 and the arm 111. The operator performs return operation of the accelerator pedal 152 just before thrusting into the natural ground 130. For this reason, the engine rotational speed is in the low rotational speed region (for example, a speed region not more than Nq2) at the time of the thrust to the natural ground 130. The operator again performs stepping operation of the accelerator pedal 152 at the same time of the thrust into the natural ground 130, makes the bucket 112 penetrate the natural ground 130, and also makes the front work device work to perform the excavation work. At this time, since a traveling load and a work load rapidly rise, engine stall might occur when the engine output torque is decreased also in the low rotational speed region according to the decrease in the urea water remaining amount. In contrast with this, in the present embodiment, for example, at the time of the second limited stage, the engine output torque was made not to decrease in the range where the actual engine rotational speed was not more than Nq2 (Ns≤Nq2). For this reason, even in the case where the engine output torque is decreased according to the decrease of the remaining amount of the urea water, the operator can continue his work, and can replenish the urea water at a desired time after completing predetermined work.

(3) The discharge starting speed Ny at which the HST pump 180 starts discharge is set to be not less than the low-idle rotational speed Ns of the engine 190. For this reason, occurrence of engine stall in the low rotational speed region can be prevented more reliably.

—Second Embodiment—

Figure 9A:
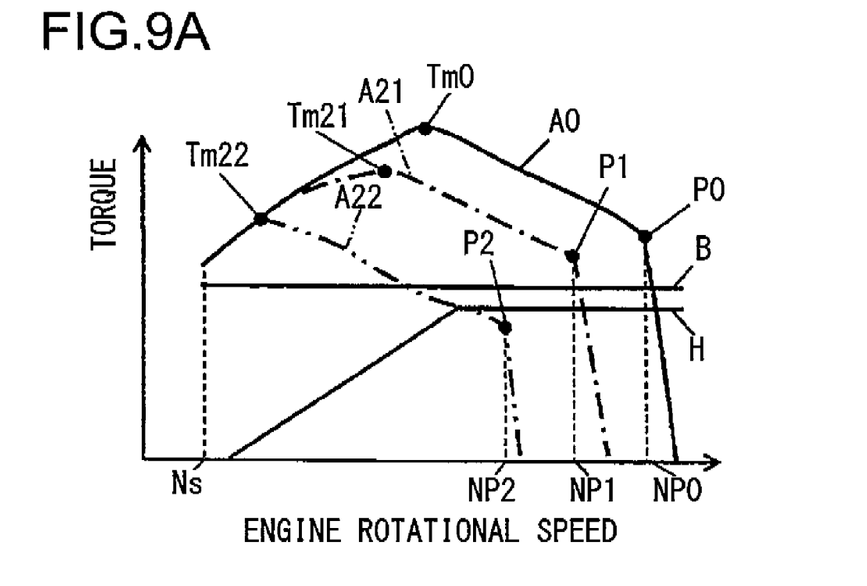
FIGS. 9A and 9B are torque diagrams of a wheel loader according to a second embodiment of the present invention.
Figure 9B:
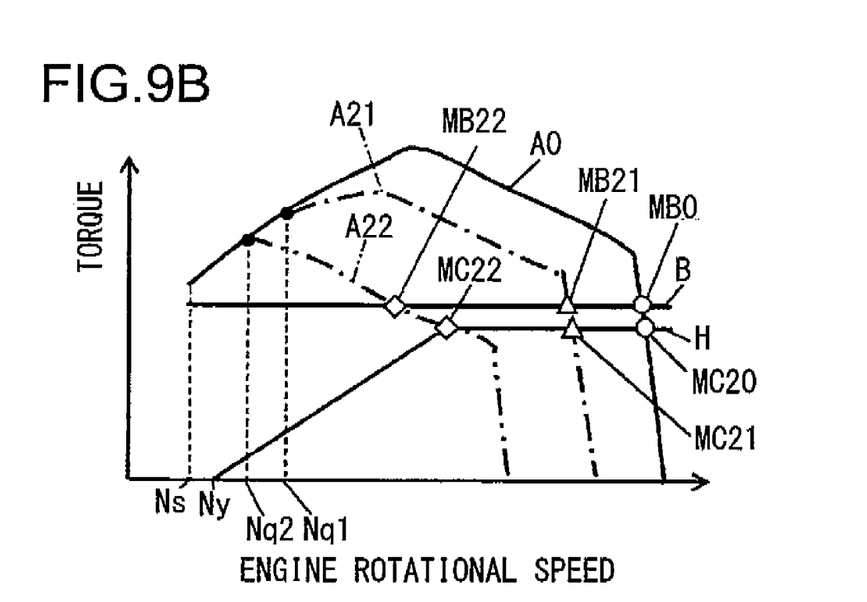

A second embodiment of the present invention will be explained with reference to FIGS. 9A and 9B. Note that the same symbol is attached to the same portion as the first embodiment or a portion corresponding thereto, and that a difference from the first embodiment is mainly explained. A point where the second embodiment differs from the first embodiment is an engine output torque characteristic stored in the storage device of the controller 10. FIGS. 9A and 9B are torque diagrams of a wheel loader according to the second embodiment of the present invention.

As shown in FIGS. 9A and 9B, in the second embodiment, according to the decrease of the remaining amount of the urea water, the output torque of the engine 190 is decreased, and also a maximum rotational speed of the engine 190 is decreased. Engine output torque characteristics A21 and A22 are stored in the storage device of the controller 10 instead of the engine output torque characteristics A1 and A2, which have been explained in the first embodiment. The characteristics A0, B, and I-I are similar to those in the first embodiment.

The engine output torque characteristic A21 is the characteristic in which the characteristic A0 has been shifted to low rotation and low torque side, and the engine output torque characteristic A22 is the characteristic in which the characteristic A21 has been further shifted to low rotation and low torque side. Similarly to the first embodiment, each characteristic is set so that a torque maximum value in the each characteristic becomes smaller in order of the characteristic A0 (the maximum torque point Tm0), the characteristic A21 (a maximum torque point Tm21), and the characteristic A22 (a maximum torque point Tm22). In addition, each characteristic is set so that the engine rotational speed in the maximum torque point becomes smaller in order of the characteristic A1, the characteristic A21, and the characteristic A22.

Reference characters P0, P1, and P2 are rated points at which rated outputs can be obtained in the characteristics A0, A21, and A22, respectively. As shown in FIG. 9A, an engine rotational speed in the rated point P0 is NP0, an engine rotational speed in the rated point P1 is NP1 smaller than NP0, and an engine rotational speed in the rated point P2 is NP2 smaller than NP1 (NP2<NP1<NP0).

That is, in the second embodiment, the engine rotational speed for obtaining the rated output in each characteristic is set so as to be smaller in stages according to the decrease of the remaining amount of the urea water. In other words, each characteristic is set so that the engine maximum rotational speed at the time of no load of the pump becomes smaller in order of the characteristics A0, A21, and A22.

As shown in FIG. 9B, the HST pump input torque and the engine rotational speed become values of a matching point MC20 in the traveling system single operation state in the unlimited stage, and the working pump input torque and the engine rotational speed in the work system single operation state in the unlimited stage become values of the matching point MB0.

As shown in FIG. 9B, the HST pump input torque and the engine rotational speed become values of a matching point MC21 in the traveling system single operation state in the first limited stage, and the working pump input torque and the engine rotational speed in the work system single operation state in the first limited stage become values of a matching point MB21.

As shown in FIG. 9B, the HST pump input torque and the engine rotational speed become values of a matching point MC22 in the traveling system single operation state in the second limited stage, and the working pump input torque and the engine rotational speed in the work system single operation state in the second limited stage become values of a matching point MB22.

Note that the characteristics A21 and A22 may be set so that the matching points MB21 and MB22 become the same as the matching points MB1 and MB2 of the first embodiment.

According to such second embodiment, operational effects similar to those in the first embodiment are exerted. In the second embodiment, since the rotational speed of the engine 190 in the rated point is decreased according to the decrease of the remaining amount of the urea water, a highest vehicle speed decreases, traveling acceleration slightly decreases, and an operation speed of the front work device decreases. For this reason, the operator can be urged more clearly to replenish the urea water compared with the first embodiment.

The following modifications also fall within the scope of the present invention, and it is also possible to combine one or more modified examples with the above-mentioned embodiments.

(1) As an example of combining the plurality of embodiments, for example, the engine output torque characteristic A1, which has been explained in the first embodiment, may be selected in the first limited stage, and the engine output torque characteristic A22, which has been explained in the second embodiment, may be selected in the second limited stage.

(2) Although in the above-mentioned embodiments, the example has been explained where an engine output torque characteristic is changed according to the three stages of the unlimited stage, the first limited stage, and the second limited stage, the present invention is not limited to this. For example, stages may be separated into four or more stages, and the engine output torque characteristic may be changed.

(3) In the first embodiment, the engine output torque characteristics are decreased in stages in order of A0 to A1 to A2 according to the decrease of the remaining amount of the urea water. In addition, although in the second embodiment, the engine output torque characteristics are decreased in stages in order of A0 to A21 to A22 according to the decrease of the remaining amount of the urea water, the present invention is not limited to this. The present invention is not limited only to the case of changing the engine output torque characteristic in stages, and the characteristic may be continuously changed.

(4) Although in the above-mentioned embodiment, the engine output torque characteristic A1 is made to match with the engine output torque characteristic A0 in the range where the engine rotational speed is not more than the threshold value Nq1, and the engine output torque characteristic A2 is made to match with the engine output torque characteristic A0 in the range where the engine rotational speed is not more than the threshold value Nq2, the present invention is not limited to this. A threshold value for deciding an engine rotational speed range where the engine output torque characteristic is not decreased may not be changed in each stage. In other words, the threshold values Nq1 and Nq2 may be set to be the different values (Nq1>Nq2) in the first limited stage and the second limited stage as mentioned above, or may be set to be the same value (Nq1 =Nq2) in the first limited stage and the second limited stage, (5) Although in the above-mentioned embodiments, the example has been explained where the working pump 11 is the fixed displacement hydraulic pump, the present invention is not limited to this. The present invention can be applied also to a case where the working pump 11 is a variable displacement hydraulic pump.

(6) Although in the above-mentioned embodiments, the example has been explained where the engine output torque characteristic and the characteristic of the control current according to the engine rotational speed are stored in the storage device of the controller 10 in the form of the lookup tables, the present invention is not limited to this. For example, each characteristic may be made to be stored in the storage device of the controller 10 in a form of a function according to the engine rotational speed.

(7) Although in the above-mentioned embodiments, the example has been explained where the displacement of the HST pump 180 is controlled according to the actual engine rotational speed, the present invention is not limited to this. The control current I may be set according to the target engine rotational speed, and the displacement of the HST pump 180 may be controlled.

(8) Although the wheel loader has been exemplarily explained as one example of the work vehicle in the above-mentioned embodiments, the present invention is not limited to this and, for example, other work vehicles, such as a forklift, a telehandler, a lift truck may be employed.

The present invention is not limited to the above-described embodiments unless features of the present invention is impaired, other modes that can be considered within the scope of the technical idea of the present invention are also included within the scope of the present invention.

What is claimed is:

1. A work vehicle including a front work device, comprising:
   a traveling drive pump and a working pump driven by an engine;
   a hydraulic motor that is connected to the traveling drive pump in a closed circuit and is driven by pressure oil discharged from the traveling drive pump;
   an actuator that is connected to the working pump and drives the front work device by pressure oil discharged from the working pump;
   a rotational speed detection unit that detects an actual rotational speed of the engine;
   an exhaust gas purification device that purifies nitrogen oxide in exhaust gas discharged from the engine using a reducing agent solution stored in a reducing agent tank;
   a remaining amount detection device that detects a remaining amount of the reducing agent solution in the reducing agent tank; and
   a torque control unit that controls output torque of the engine according to decrease of the remaining amount of the reducing agent solution detected by the remaining amount detection device, wherein
   a threshold value as to a rotational speed of the engine is set for the torque control unit to control the output torque of the engine,
   an engine rotational speed at which the traveling drive pump starts discharge is set to be not less than a low-idle rotational speed of the engine,
   the threshold value is set to be not less than the engine rotational speed at which the traveling drive pump starts discharge, and
   when the actual rotational speed of the engine detected by the rotational speed detection unit is not more than the threshold value, the torque control unit does not decrease the output torque of the engine regardless of the remaining amount of the reducing agent solution detected by the remaining amount detection device.

2. The work vehicle according to claim 1, wherein the torque control unit controls the output torque of the engine in stages and also decreases the threshold value according to the decrease of the remaining amount of the reducing agent solution detected by the remaining amount detection device.

3. The work vehicle according to claim 2, wherein the torque control unit controls the output torque of the engine and also decreases a rotational speed of the engine in a rated point according to the decrease of the remaining amount of the reducing agent solution detected by the remaining amount detection device.

4. The work vehicle according to claim 3, wherein the working pump is a fixed displacement hydraulic pump that supplies pressure oil to the actuator that drives the front work device.

5. The work vehicle according to claim 2, wherein the working pump is a fixed displacement hydraulic pump that supplies pressure oil to the actuator that drives the front work device.

6. The work vehicle according to claim 1, wherein the torque control unit controls the output torque of the engine and also decreases a rotational speed of the engine in a rated point according to the decrease of the remaining amount of the reducing agent solution detected by the remaining amount detection device.

7. The work vehicle according to claim 6, wherein the working pump is a fixed displacement hydraulic pump that supplies pressure oil to the actuator that drives the front work device.

8. The work vehicle according to claim 1, wherein the working pump is a fixed displacement hydraulic pump that supplies pressure oil to the actuator that drives the front work device.

* * * * *